United States Patent
Corbeil et al.

(10) Patent No.: US 8,506,242 B2
(45) Date of Patent: Aug. 13, 2013

(54) METHOD OF MAKING A HEAT EXCHANGE COMPONENT USING WIRE MESH SCREENS

(75) Inventors: Antoine Corbeil, Gatineau (CA); Gregoire Berube, Gatineau (CA); Michel Houde, Gatineau (CA); Eric Matte, Gatineau (CA)

(73) Assignee: Brayton Energy Canada, Inc., Gatineau, Quebec (CA)

( * ) Notice: Subject to any disclaimer, the term of this patent is extended or adjusted under 35 U.S.C. 154(b) by 678 days.

(21) Appl. No.: 12/773,606

(22) Filed: May 4, 2010

(65) Prior Publication Data
US 2011/0272122 A1    Nov. 10, 2011

(51) Int. Cl.
*F01D 25/08*   (2006.01)

(52) U.S. Cl.
USPC ................. 415/116; 427/209; 416/97 A

(58) Field of Classification Search
USPC ............ 415/115, 116; 416/97 A, 229 R, 416/230; 165/80.4, 164, 170, 907; 427/180, 427/191, 209, 422, 455, 456, 554, 556, 597
See application file for complete search history.

(56) References Cited

U.S. PATENT DOCUMENTS

| | | | |
|---|---|---|---|
| 3,783,969 A * | 1/1974 | Pall | 181/286 |
| 4,230,175 A | 10/1980 | Disselbeck | |
| 4,981,172 A * | 1/1991 | Haerle | 165/133 |
| 5,196,232 A * | 3/1993 | Kitazaki et al. | 427/180 |
| 5,396,949 A | 3/1995 | Kawabata | |
| 5,601,895 A * | 2/1997 | Cunningham | 428/66.6 |
| 5,983,992 A | 11/1999 | Child | |
| 6,192,976 B1 * | 2/2001 | Yoshida et al. | 165/171 |
| 6,305,079 B1 | 10/2001 | Child | |
| 6,365,274 B1 * | 4/2002 | Scheckenbach et al. | 428/402 |
| 6,533,547 B2 * | 3/2003 | Anding et al. | 416/97 R |
| 2004/0009106 A1 | 1/2004 | Galligan | |
| 2005/0075408 A1 * | 4/2005 | Ringeisen et al. | 521/64 |
| 2005/0147764 A1 * | 7/2005 | Bauer | 427/446 |
| 2007/0074853 A1 * | 4/2007 | Popovich | 165/80.4 |
| 2009/0183857 A1 | 7/2009 | Pierce | |
| 2010/0326659 A1 * | 12/2010 | Schultz et al. | 166/297 |

FOREIGN PATENT DOCUMENTS

DE        19520146 C1        6/1996

OTHER PUBLICATIONS

B.Jodoin, P. Richer, G. Berube, L. Ajdelsztajn, A. Erdi-Betchi, "Pulsed-Gas Dynamic Spraying: Porcess analysis, development and selected coating samples, Surf. Coat. Technol., 201 (16-17), May 2007, pp. 7544-7551".

B.Jodoin, P. Richer, G. Berube, L. Ajdelsztajn, A. Erdi-Betchi, M. Yandouzi, "Pulsed-Gas Dynamic Spraying: Process analysis, development and selected coating examples", Surface & Coatings Technology 201, Feb. 2007, pp. 7544-7551.

* cited by examiner

*Primary Examiner* — Edward Look
*Assistant Examiner* — Liam McDowell
(74) *Attorney, Agent, or Firm* — Marks & Clerk; Richard J. Mitchell

(57) ABSTRACT

A heat exchanger component is made by forming a wafer having a pair of opposed outer major faces with interstices between them from a stack of wire mesh screens. The outer major surfaces of the wafer are sealed by depositing a metal coating on them. The deposited metal coatings define between them a flow path for a heat exchange fluid extending through the interstices of the wafer.

19 Claims, 6 Drawing Sheets

METHOD OF MAKING A HEAT EXCHANGE COMPONENT USING WIRE MESH SCREENS

FIELD OF THE INVENTION

This invention relates to a method of making a heat exchange component, and in particular to method of making a heat exchange component using wire mesh screens, as well as to a heat exchange component using such screens.

BACKGROUND OF THE INVENTION

Heat exchangers play a vital part in ongoing efforts to conserve energy as well in as many thermodynamic systems. In any heat exchanger, the object is to achieve maximum heat transfer between heat exchange fluids with the minimum consumption of energy caused by flow resistance through the heat exchanger. It is also generally desirable to make the heat exchanger as compact as possible.

Recent developments in heat exchanger technology have predominantly concentrated in achieving higher heat transfer efficiencies by means of increased heat loads in more compact heat exchanger units. An effective approach to obtaining high levels of heat transfer in a compact volume is to maximize the contact area ratio between the hot fluid and the conducting material surface. This concept has led to the development of low profile plate-like heat exchangers consisting of large surface area conductive material inserts such as metallic foam or wire mesh, whose outer surfaces are sealed by means of brazed sheets. The highly irregular flow path within the heat exchanger increases mixing of the hot fluid and therefore promotes heat transfer to the conductive material insert and outer surfaces of the heat exchanger. Examples of such heat exchangers are shown in U.S. Pat. Nos. 6,305,079 and 5,983,992.

The effectiveness of such heat exchangers is greatly dependent on the nature and structure of the conductive material insert. In addition, various insert structures such as metallic foams, wire screens, and packed beds all feature different behaviors depending on the Reynolds number of the flow. For example, metal foam heat exchangers (MFHE) have been used extensively in cryogenics, power generation and many other fields requiring high heat load removal. They are relatively inexpensive, easy to form when mass-produced and capable of achieving surface area to volume ratios as high as 10,000 $m^2/m^3$. However, the inherent difficulty in manufacturing metal foam heat exchangers is how to maintain consistency in the geometry. Another limitation is that although models assume a well-aligned structure, actual MFHE cells are randomly positioned, which reduces the likelihood of direct conduction to the outer surfaces. Structures such as packed beds (sintered) outperform other heat exchanger designs in terms of a ratio of heat transfer to pressure loss. Although a packed bed of sintered metal balls may be more effective for heat transfer, its strength in tension (for use as a pressure vessel) is far less than wire screen.

The use of wire mesh as a conductive material insert in heat exchangers was first investigated in the late 1980s. Since then, many different mesh configurations have been considered and tested with varying degrees of success. Wire mesh heat exchangers (WMHE) have been shown to be more efficient than metal foam heat exchangers as they promote direct heat conduction to the outer walls while limiting axial conduction due to minimal contact between the screens. WMHEs are also easier to manufacture given that they are produced from readily available woven wire-screen textiles. These are relatively inexpensive and can easily be made of a wide variety of alloys. As manufacturing capabilities progress, more complex designs have emerged as attractive alternatives due to their potentially high Nusselt numbers and low friction factors. While these structures are expected to improve heat transfer efficiency, the potential slight gain in performance when compared to woven textiles may not justify the additional manufacturing costs.

Methods for producing WMHEs involve folding screens and brazing thin sheets to the tips of the folds. While these approaches are relatively simple to implement, they do however limit the conduction to the outer walls due to the smaller contact surface and the maximum number of times it can be folded per unit length. Another technique for making WMHEs considered by the inventor consists in sintering a stack of woven wire textiles, cutting them perpendicular to the stacked direction to form thin wafers, and then effectively sealing these wafers by brazing thin metal sheets on either sides. WMHEs manufactured by this method have been shown to successfully withstand internal pressures above 10000 psi. A drawback to this technique however is that the brazing process can be expensive due to high energy consumption, and this can mitigate against using WHMEs.

SUMMARY OF THE INVENTION

The inventors have discovered that a particularly effective heat exchange component can be fabricated from a wire mesh stack by sealing the outer faces with a metal coating. These coatings confine a flow path for a heat exchanger fluid through the interstices of the stack.

Thus, according to the present invention there is provided a method of making a heat exchange component, comprising forming a wafer having a pair of opposed outer major faces with interstices between them from a stack of wire mesh screens; and sealing the outer major faces of the wafer by depositing a metal coating thereon, the deposited metal coatings defining between them a flow path for a heat exchange fluid extending through the interstices of the wafer.

It will be understood that a deposited coating is a coating that is applied in some way, e.g. in liquid or powder particle form, such that the resulting metal layer is formed in situ on the wafer.

The heat exchange component may form part of a heat exchanger or it could also be part of another component that requires intense cooling or heating. For example, one particularly suitable application is as a stator for use in a turbine. Instead of being cast, as is conventional, the stator can be made of the heat exchange component, namely a block made from a stack of wire screens with a deposited metal coating in accordance with embodiments of the invention.

A particularly promising and cost-effective approach to seal the wire mesh wafers is to apply a dense coating on the major faces using a thermal spray technique characterized with an elevated material deposition rate, such as Pulsed Gas Dynamic Spraying (PGDS). PGDS is a thermal spray technique that is currently being commercialized by Centerline (Windsor) Ltd. (Windsor, Ontario, Canada). In PGDS, a solenoid valve is used to mimic the case of a high-pressure zone (driver section) separated from a low-pressure zone (driven section) by a thin membrane that would rupture instantaneously thereby sending a shockwave down a cylindrical tube. As the shockwave travels down the tube, it entrains powder particles and accelerates them to velocities comparable to those observed in Cold Gas Dynamic Spraying (CGDS) and HVOF. Upon impact, the particles plastically deform and adhere to the substrate to form a coating. Like CGDS, PGDS is considered a solid-state process where powder particle temperatures always remain below their melting point. A more detailed description of the PGDS process is available in B. Jodoin, P. Richer, G. Bérubé, L. Ajdelsztajn, A. Erdi-Betchi, M. Yandouzi, Pulsed-Gas Dynamic Spraying: Process analysis, development and selected coating examples, Surf. Coat. Technol., 201 (16-17), 2007, pp. 7544-7551, the contents of which are herein incorporated by reference. The PGDS technique uses either Helium or Nitrogen as process gas and due to its pulsating nature, it has been characterized with lower gas consumption rates in comparison to CGDS.

Other methods for forming the boundary layer, such as line of sight deposition or selective laser melting can be employed.

The wafer can be made by forming a stack of woven wire mesh screens, compressing them and sintering them together, and then dicing them in a plane perpendicular to the plane of the screens. It will be understood by one skilled in the art that perpendicular in this context means generally at right angles to the plane of the screens, and it will be appreciated that strict orthogonality is not necessary for the invention to work.

The powder spray may be steel with a spherical morphology and particle sizes below 44 µm in diameter.

The heat exchange component may be assembled into a complete heat exchanger by adding fins and collector and delivery manifolds for the heat exchanger fluid. Alternatively, as noted, it may form part of another component that requires heating or cooling, such as turbine stator.

In accordance with another aspect therefore the invention provides a heat exchange component, comprising a wafer formed from a stack of wire mesh screens and having a pair of opposed outer major faces with interstices between them; and a metal coating deposited on each of the outer major faces of the wafer to confine a flow path for a heat exchange fluid extending through the interstices of the wafer between the metal coatings. The invention also extends to a heat exchanger including such as component.

BRIEF DESCRIPTION OF THE DRAWINGS

The invention will now be described in more detail, by way of example only, with reference to the accompanying drawings, in which:—

DETAILED DESCRIPTION OF EXEMPLARY EMBODIMENT

Figure 1:
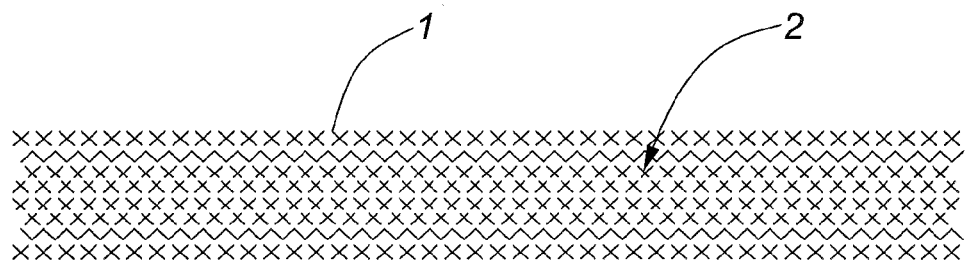
FIG. 1 is a cross section through a stack of screens for use in the fabrication of a heat exchanger component.

In order to make a heat exchange component in accordance with an embodiment of the invention, a number of individual woven wire mesh screens 1 are laid on top of each other to form a stack 2 as shown in FIG. 1. In one example, each screen is made of type 304 stainless steel characterized as 100 mesh (100 wires per inch) with 0.11 mm diameter wires woven perpendicular to each other in a square weave configuration. Type 304 stainless steel is a commercially available T 300 Series Stainless Steel austenitic alloy. It has a minimum of 18% chromium and 8% nickel, combined with a maximum of 0.08% carbon. It will be understood that the mesh parameters can be varied (mesh size, wire diameter, orientation and weave type).

Figure 2:
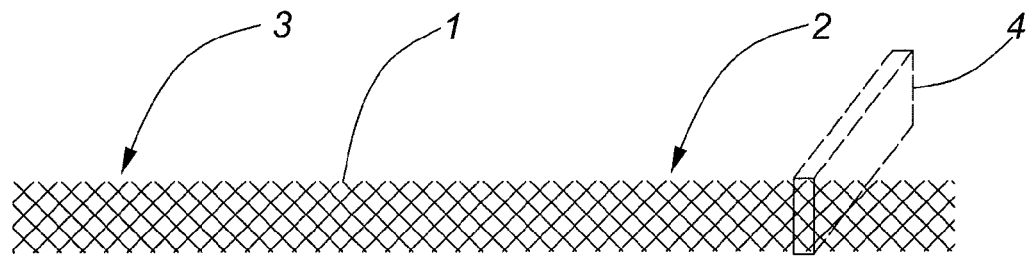
FIG. 2 is a cross section through the stack after compression and sintering.

The stack is then compressed between 25 to 40% in height and the mesh held together in some way to form a brick 3 as shown in FIG. 2. This can be achieved, for example, by sintering or polymer injection, or simply by inserting the stack into a fixture to hold the screens 1 in place while the component is fabricated.

In the case of sintering, after the screen mesh stack 2 has been compressed, it is placed inside an oven heated to high temperatures. The transmitted thermal energy combined with the compressive pressure creates a bond between the mesh squares.

In the case of polymer injection, a polymer is injected into the stack 2. Once the polymer has solidified, it retains the mesh in shape. It is then subsequently removed, for example, by heating to a high temperature to burn it out.

In the case where the screen mesh stack 2 is compressed by a fixture, the four sides of the brick 3 must be coated with a pressure boundary layer in the form of an applied metal coating before the fixture can removed and the next steps be taken.

The wafers 4 are cut from the brick 3 by dicing the brick in a plane perpendicular to the major surface of the brick to form wafer 4. The brick can be cut, for low volume production, with a band saw or diamond saw or wire, and for high volume production with a gang diamond wire saw. In the case of the compressed brick, the pressure boundary must be reapplied between each cut.

Figure 3:
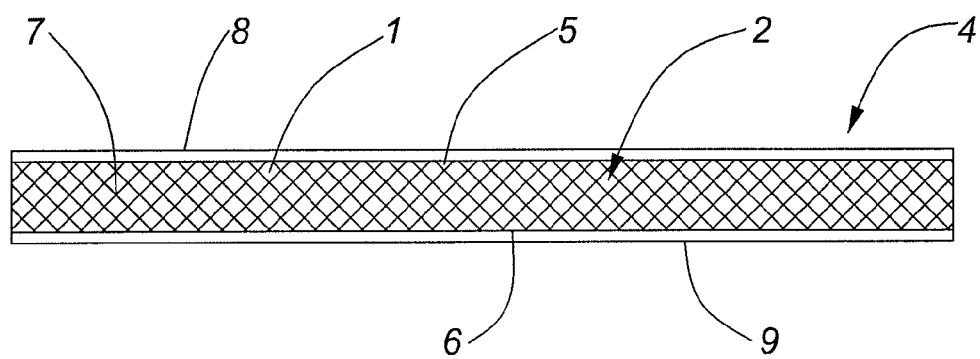
FIG. 3 is a cross section through a wafer with an applied pressure boundary layer.

The resulting wafer shown in FIG. 3 has a pair of opposed major faces 5, 6 on the slice with interstices 7 formed within the wafer between the wires of the stacked woven screens 1.

The wafer dimensions typically vary within: core width between 2 and 12 inches, flow length varies between 2 and 6 inches and the wafer thickness between 60 and 200 thousandths of an inch.

The major faces 5, 6 of the wafer are sealed by applying a metal coating 8, 9 forming a pressure boundary layer on each of the major faces 5, 6 of the wafer. In this example, the metal coating is applied by pulsed gas dynamic spraying, although other methods can be used, such as spraying, line of sight deposition, or selective laser sintering.

The pressure boundary layer may typically vary between 2 and 15 thousandths of an inch. The material used to create said boundary layer can be of the same material as the core or of a completely different type. Both boundary layer material and thickness will depend on the pressure of the fluid to be contained. At this point, if the core was created by infusing or injecting a polymer, the polymer is removed by applying heat, in which case the polymer will be burn out of the brick.

Once formed, the boundary layer can be milled and polished to produce a smooth surface. In one exemplary embodiment the pressure boundary was applied as a coating using PGDS with the following parameters:

| Trial # | Gas reservoir pressure (MPa) | Powder preheating temperature(° C.) | Traverse speed (mm/s) |
|---|---|---|---|
| 1 | 2.5 | 300 | 2 |
| 2 | 3 | 350 | 2 |
| 3 | 3 | 350 | 2 |
| 4 | 3.5 | 350 | 3.5 |
| 5 | 3.5 | 350 | 4.5 |

Helium was used as the propellant gas because of its high specific heat ratio and sonic velocity. The gas was preheated to a temperature of 500° C. with a pulsing frequency of 10 Hz. The metal powder was #304 steel with a spherical morphology and particle sizes below 44 μm in diameter.

The coatings were observed to build-up quite rapidly to thicknesses in the range of 1 mm. The particle penetration was found to be minimal. Firstly, the coating surrounds the exposed vertical wires providing a stronger bond capable of holding higher pressures. Secondly, the lack of penetration abates the pressure loss through the heat exchanger, hence increasing its efficiency.

Figure 4A:
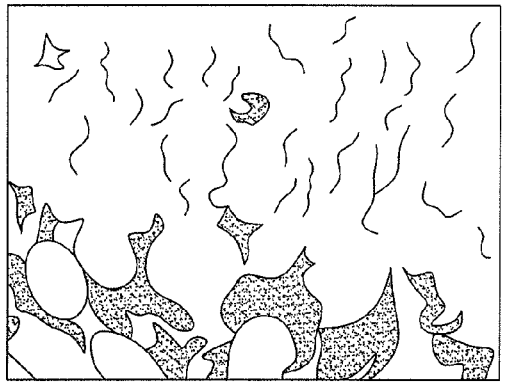
FIGS. 4a and 4b are micrographs of applied coatings.
Figure 4B:
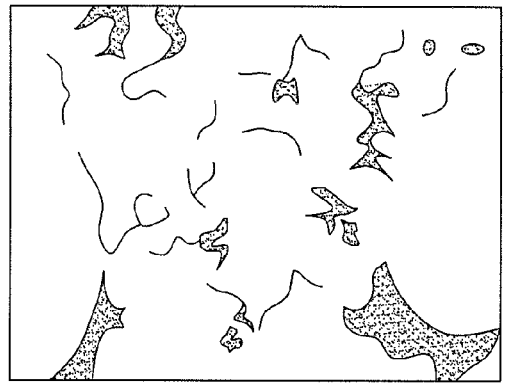

Despite spraying onto a mesh surface with voids much larger than the actual powder particles, the particles can be seen to agglomerate and effectively clog the voids in the mesh, thereby forming a continuous surface on which the coating can build-up. Clogging of the mesh however appears limited to the first few layers of wire screen in the wafer as shown in FIG. 4a. While some of the powder particles bypass the first set of wires, these are then blocked by the following set beneath/between them. In this case, the staggered pattern of the screen layers effectively reduces the size of the voids in the mesh and results in minimal penetration of the particles into the wafer. This allows the particles to fill the voids, as shown in FIG. 4b, thereby providing a continuous surface on which subsequently deposited particles can build-up.

Figure 5:
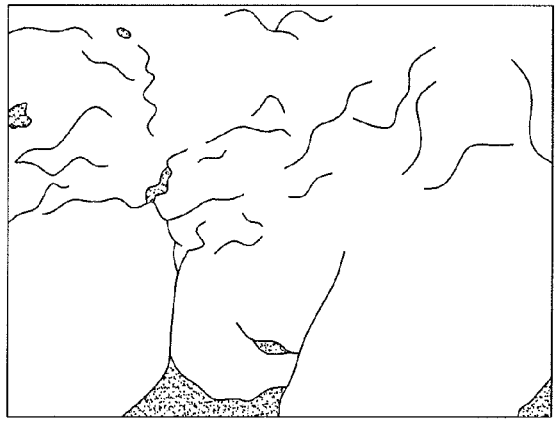
FIG. 5 shows the particle wedging effect in the screens.

FIG. 5 shows how some of the sprayed particles become wedged between the mesh wires and aid in sealing the outer layers. Given the pulsing nature of the PGDS deposition process, particles strike the substrate as relatively large powder clusters as opposed to a more continuous stream of particles. When such a cluster travels between two mesh wires, the particles are compress together and clog the mesh. Once again, as a solid surface is formed, other spherical particles impact the substrate and plastically deform to build-up a coating.

The wires in the vertical direction can also contribute to impede the flow of particles. In this case, a large powder particle is observed to have deformed on the tip of a mesh wire, thereby providing a larger surface on which subsequent particles can deposit. The relative importance of this coating build-up mechanism is believed to be influenced by the amount of compression of the screen stacks.

Three samples were subjected to burst testing in order to assess the pressure capacity of the PGDS coated wafer substrates. The results were as follows:

| Sample | Burst Pressure psi (MPa) |
|---|---|
| a) | 800 (5.51) |
| b) | 1200 (7.58) |
| c) | 1400 (9.65) |

Using the PGDS technique, metal powder can be successfully deposited at the surface of stacked and sintered wire mesh wafers with porosities as low as 1.6%. Penetration of the powder particles in the mesh was observed to be minimal, which is desirable as it is expected to mitigate pressure losses through the mesh and result in higher overall heat exchanger efficiency. Results from the burst tests showed that pressures as high as 1400 psi can be achieved using this manufacturing technique.

Figure 6:
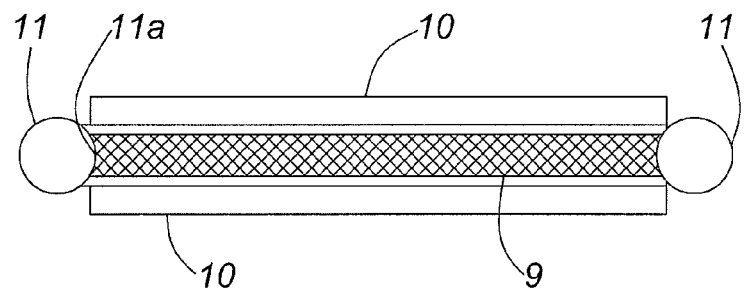
FIG. 6 is a cross section through a wafer including headers and fins to form a heat exchanger.
Figure 7:
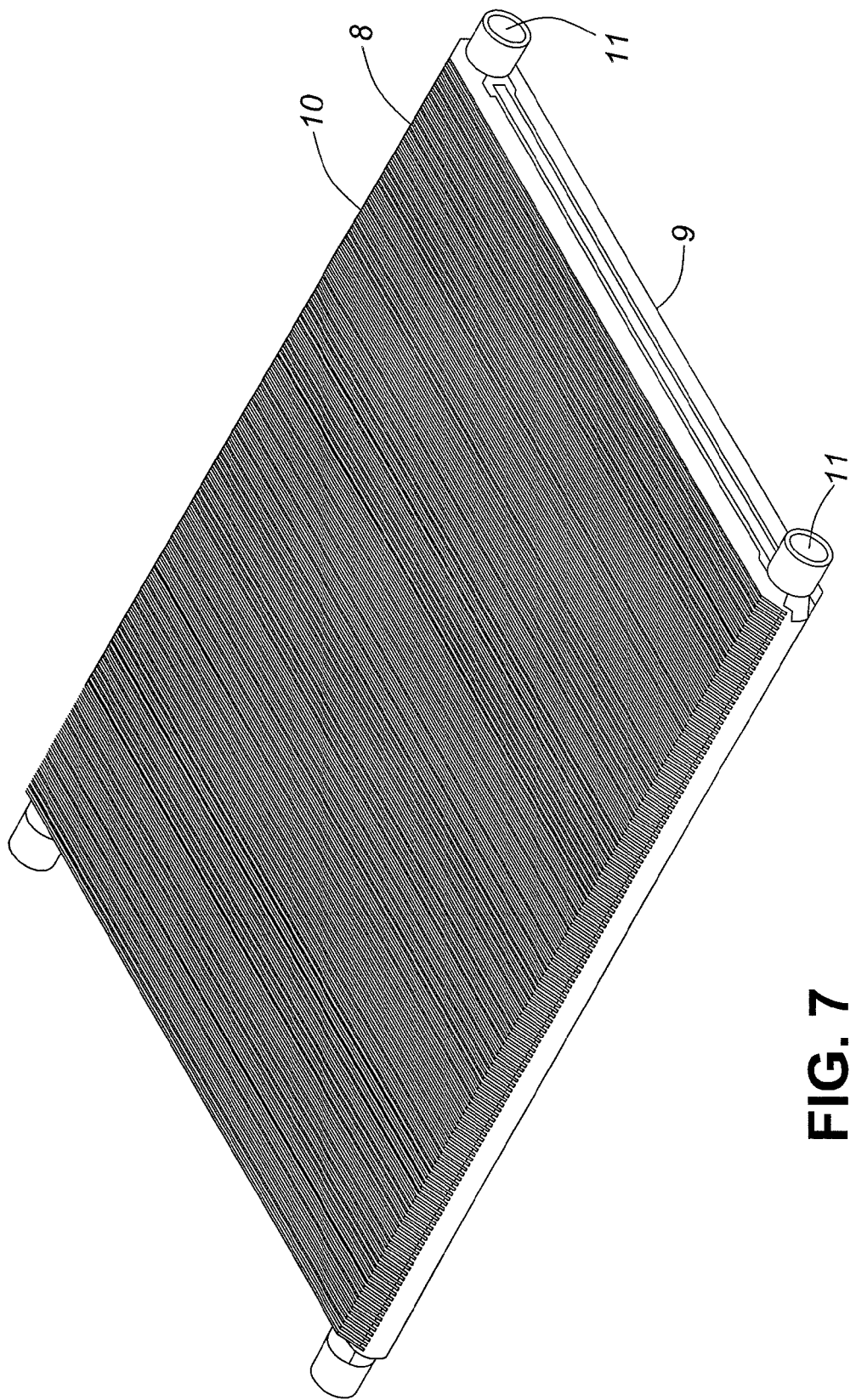
FIG. 7 is a perspective view of the heat exchanger.

The resulting sealed wafer complete with pressure boundary as shown in FIG. 3 is known as the base. In order to form a complete heat exchanger, as shown in FIGS. 6 and 7, an extended surface in the form of an array of parallel fins 10 is created on top of the boundary layer. A flow path for a second heat exchange fluid is defined between the fins 10 so that heat is transferred through the boundary layer and fins between the first heat exchange fluid flowing within the wafer in a direction parallel to the fins and the second heat exchange fluid flowing outside the wafer between the fins. Any conventional heat exchange fluid can be used.

It has also been found that improved results are obtained if an initial spraying is conducted with a nozzle at an angle to the surface so as to project the spray at a shallow (i.e. less than 30°) angle of incidence, for example, 15°. This allows a small coating to build up in the spray direction to partly cover the voids in the mesh surface. A subsequent coating is then performed with the spray nozzle at 90° angle of incidence to build up a larger deposit.

Another technique is to fill the voids with a polymer, such as a Cyclics #100 polymer, spray the metal onto the surface with the voids filled by the polymer, and then subsequently remove the polymer.

The extended surface can be created on the base in several ways. Examples are: Line of Sight Deposition/Cutting, Line of Sight Deposition/Chemical Etching, Selective Laser Sintering and Brazed Folded Sheet. Each manufacturing process offers different advantages to the overall heat exchanger performance.

Figure 8:
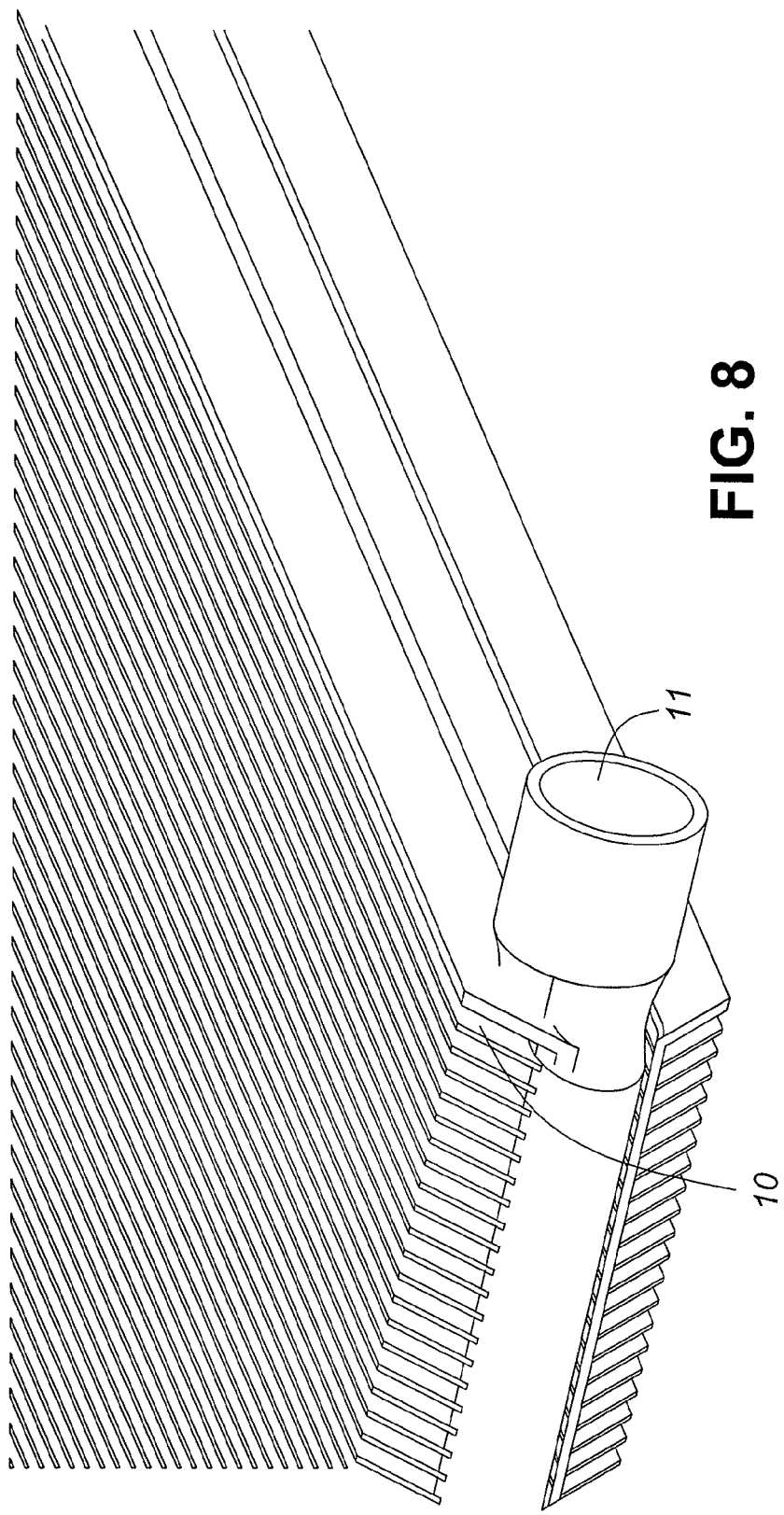
FIG. 8 is a detail of the heat exchanger shown in FIG. 7.

As shown in FIGS. 6, 7, and 8, the fins 10 are built on top of the boundary layer formed by the deposited surfaces 8, 9. They can be built up by a spray process, additive manufacturing or they can be brazed on. All three solutions offer different advantages to the overall process and final heat exchanger performances.

In Line of Sight Deposition, the base material of the fins is sprayed on after which the excess material is either cut or etched away to produce the final shape of the fins.

In Selective Laser Melting, the final shape of the fins is fused to the boundary layer with the laser.

In brazing, the fins are shaped from thin sheet and brazed to the boundary layer.

The material used to create the fins 10 can be the same as the material used to make core, the boundary layer or of a different type completely. A combination of two or more materials can be used in varying concentrations along the flow length of the base. The selection of the material type will depend on the external fluid and the heat exchanger parameters. The height of the fins typically varies between 50 and 200 thousands of an inch.

Figure 9:
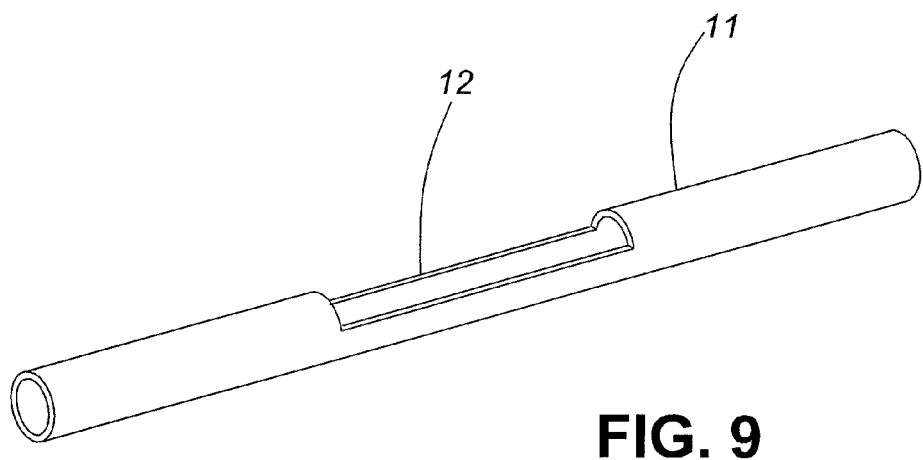
FIG. 9 shows a header manifold.
Figure 10:
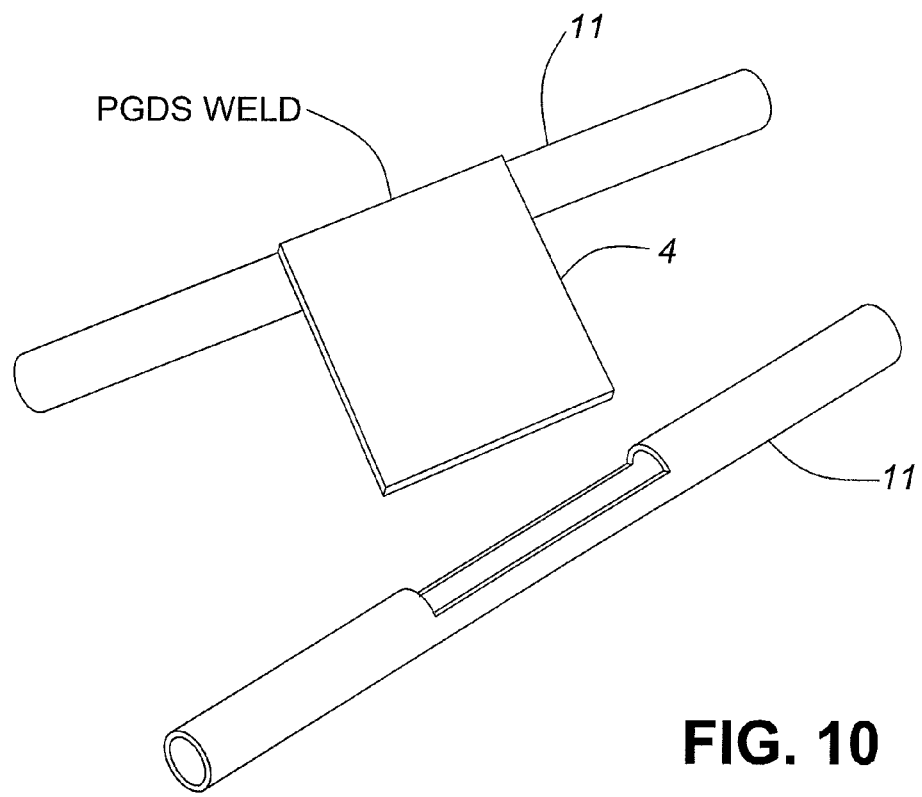
FIG. 10 shows a partially formed heat exchanger and manifold.

Header manifolds 11 with openings 11a are attached to direct the internal fluid to and from the core as shown in FIGS. 9 and 10. The header manifolds are in the form of tubes with a milled slot 12 or holes exposed to the interior space of the wafer 4.

The header manifolds 11 extend along the long sides of the heat exchanger component and are created by welding a hollow section to the base and fin assembly or by selective laser sintering. The material of the manifolds can be the same as the core, pressure boundary layer, fins or of a different type completely. The selection of the material type will depend on the internal fluid parameters.

The manifolds 11 may be welded to the boundary layer during the spray process to create the base material for the fins. It will be noted that in this example the first heat exchanger fluid flows within the heat exchanger core between the manifolds 11 parallel to the direction of the fins. As it does so the first heat exchanger fluid comes into contact with the wire filaments of the screen, and the heat is conducted to the boundary layers 8, 9, which are coupled to the fins in a heat conductive relationship. As the second heat exchange fluid flows between the fins 10, heat is exchanged between the fins and this fluid.

Figure 11:
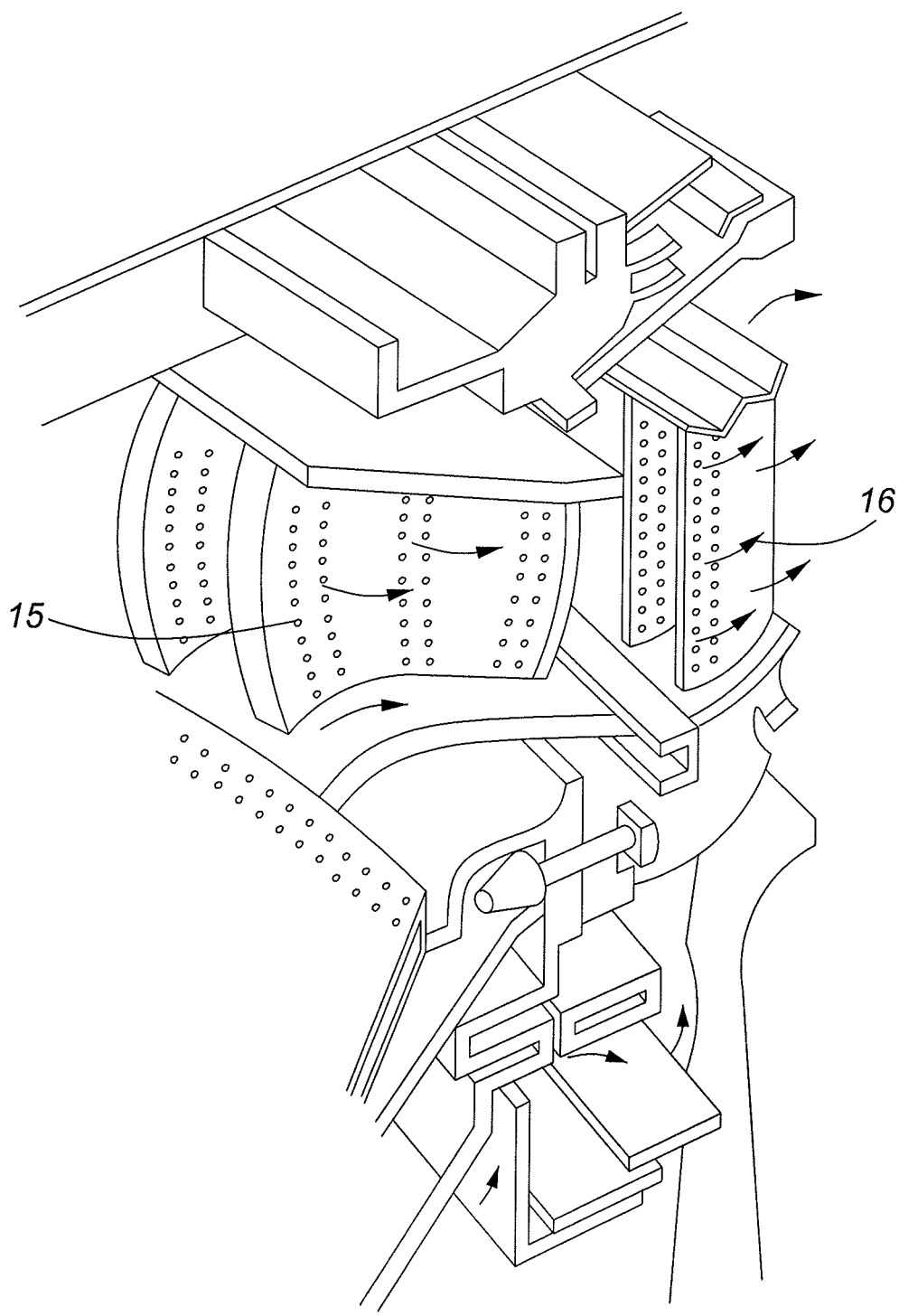
FIG. 11 is a cutaway view of a turbine.

The invention also has application to stators for use in turbines as shown in FIG. 11. In a conventional turbine, the rotor blades 16 turn past the stators or nozzle guide vanes 15. In a conventional turbine, the nozzle guide vane is cast and cooled with the high pressure cooling air flowing over its surface. In accordance with an embodiment of the invention, instead of being cast the nozzle guide vane is made from a sintered screen block using light of sight deposition technology, namely PGDS, cold spray, HVOF, plasma spray, arc-wire spray etc. in a similar manner to the block made for the heat exchanger described above. The nozzle guide vane then defines a flow path for high pressure cooling fluid to flow within the interior of the vane through the interstices between the metal coatings. For example, high-pressure air can be injected at the root of the stator and ejected at the tip.

The screen medium offers high strength. The coating can be a high-temperature alloy or a combination of bond-coating and ceramic. Air can then be directed through the interior of the stators within the screen mesh to offer highly efficient cooling.

We claim:

1. A method of making a heat exchange component, comprising:
   compressing together a stack of woven wire mesh screens;
   dicing the stack in a plane perpendicular to a plane of the individual screens to form a wafer having a pair of opposed outer major faces with interstices between them; and
   sealing the outer major faces of the wafer by depositing a metal coating thereon, the deposited metal coatings defining between them a flow path for a heat exchange fluid extending through the interstices of the wafer.

2. The method as claimed in claim 1, wherein the screens are bonded together.

3. The method as claimed in claim 2, wherein the screens are bonded together by sintering.

4. The method as claimed in claim 2, wherein the screens are temporarily held together by a fixture until the metal coatings have been applied.

5. The method as claimed in claim 1, wherein the screens are temporarily held together during manufacture by binder, which is subsequently removed when the wafer is formed.

6. The method as claimed in claim 5, wherein the binder is an infused polymer.

7. The method as claimed in claim 1, wherein the metal coatings are applied by a thermal spraying technique.

8. The method as claimed in claim 7, wherein the metal coatings are applied from a nozzle extending at an angle to the surface of the wafer at a shallow angle of incidence.

9. The method as claimed in claim 8, wherein said thermal spraying technique is pulsed gas dynamic spraying with metal powder.

10. The method as claimed in claim 9, wherein the metal powder is steel with a spherical morphology and particle sizes below 44 µm in diameter.

11. The method as claimed in claim 1, wherein the metal coatings are applied by selective laser sintering.

12. A method of making a heat exchanger, comprising:
   compressing together a stack of woven wire mesh screens;
   dicing the stack in a plane perpendicular to a plane of the individual screens to form a wafer having a pair of opposed outer major faces with interstices between them; and
   sealing the outer major faces of the wafer by depositing a metal coating thereon, the deposited metal coatings defining between them a first flow path for a first heat exchange fluid extending through the interstices of the wafer;
   attaching fins to each of the metal coatings;
   providing a header manifold at opposite ends of the wafer to deliver and collect the first heat exchange fluid; and
   providing a second flow path for a second heat exchange fluid between the heat exchange fins.

13. The method as claimed in claim 12, wherein the screens temporarily are bonded together during manufacture with a binder, which is subsequently removed when the wafer is formed.

14. The method as claimed in claim 12, wherein the metal coatings are applied by a thermal spraying technique.

15. The method as claimed in claim 14, wherein said thermal spraying technique is pulsed gas dynamic spraying with metal powder.

16. The method as claimed in claim 15, wherein the metal powder is steel with a spherical morphology and particle sizes below 44 µm in diameter.

17. A turbine stator comprising a turbine vane made of a heat exchange component, the heat exchange component comprising:
   a wafer comprising a slice of a stack of woven wire mesh screens in a plane perpendicular to a plane of the stack and having a pair of opposed outer major faces with interstices between them; and
   a metal coating deposited on each of the outer major faces of the wafer to confine a flow path for a heat exchange fluid extending through the interstices of the wafer between the metal coatings.

18. The turbine stator as claimed in claim 17, wherein the coating is made from an applied steel powder with a spherical morphology and particle sizes below 44 µm in diameter.

19. A heat exchanger comprising:
   a wafer comprising a slice of a stack of woven wire mesh screens in a plane perpendicular to a plane of the stack and having a pair of opposed outer major faces with interstices between them; and
   a metal coating deposited on each of the outer major faces of the wafer to confine a flow path for a first heat exchange fluid extending through the interstices of the wafer between the metal coatings; and
   cooling fins on the metal coating defining between them a flow path for a second heat exchange fluid.

* * * * *